United States Patent

[11] 3,631,590

[72] Inventors Arnold Wichmann;
 Herbert Amborn, both of Mulheim (Ruhr), Germany
[21] Appl. No. 783,961
[22] Filed Dec. 16, 1968
[45] Patented Jan. 4, 1972
[73] Assignee Siemens Aktiengesellschaft
 Berlin, Germany
[32] Priority Dec. 16, 1967
[33] Germany
[31] P 16 13 441.1

[54] METHOD FOR IMPREGNATING AND HARDENING WINDING RODS, COILS OR SEMICOILS OF ELECTRICAL MACHINES IN CORRECT DIMENSIONS
 6 Claims, 9 Drawing Figs.
[52] U.S. Cl. .................................................. 29/596,
 264/272, 310/43, 310/45, 310/260, 310/270
[51] Int. Cl. .......................................................H02k 15/00
[50] Field of Search............................................ 29/596,
 598; 264/272; 310/43, 45, 260, 270

[56] References Cited
 UNITED STATES PATENTS

| | | | |
|---|---|---|---|
| 2,980,757 | 4/1961 | Coogeshall et al............ | 29/596 UX |
| 2,994,735 | 8/1961 | Marshall et al. ............. | 29/596 UX |
| 3,050,787 | 8/1962 | Richardson et al. ......... | 310/43 X |
| 3,431,639 | 3/1969 | Reimer et al. ................ | 29/596 X |
| 3,474,527 | 10/1969 | Meyer ........................... | 29/596 |

*Primary Examiner*—John F. Campbell
*Assistant Examiner*—Carl E. Hall
*Attorneys*—Curt M. Avery, Arthur E. Wilfond, Herbert L. Lerner and Daniel J. Tick ABSTRACT: Described is method and apparatus impregnating and hardening, in correct dimensions, wrappings, preferably comprised of mica-containing tapes or bands with a low-adhesive content for insulating winding rods, coils or semicoils, particularly for high-voltage machines, whereby the insulating jacket, wound around the winding elements, is impregnated with a synthetic resin having hardening properties. The synthetic resin having penetrated the insulating jacket, is hardened in a manner which defines in correct dimensions the outer dimensions of the finished insulation. To this end, a plurality of winding elements is placed into an impregnating and hardening form, which contains receiving channels corresponding to the groove dimensions of the stator stack of laminations which will later be provided with the winding. The winding elements, in a nonimpregnated condition, are inserted into said receiving channels. The method is characterized by the fact that said winding elements are inserted into said receiving channels of said impregnating and hardening form with spacing which is smaller than its spacing in the stator stack of laminations; thus it constitutes only a part of the tooth width. The winding elements, together with spacers or filler pieces which define the receiving channels are stacked in layers to form a unit and are locked in place. Upon unlocking the unit, after the impregnating and hardening process, the winding elements and the spacers are removed in layers.

METHOD FOR IMPREGNATING AND HARDENING WINDING RODS, COILS OR SEMICOILS OF ELECTRICAL MACHINES IN CORRECT DIMENSIONS

The present invention relates to a method and a device for impregnating and hardening, in correct dimensions, the wrappings, preferably of mica-containing tapes or strips with low adhesive contents, for insulating winding rods, coils or semicoils, particularly for high-voltage machines.

By conventional methods, generator rods or coils, provided with a wound insulating casing or accelerator-containing mica tape or bands are impregnated and removed from the saturation bath. After removal of a protective band, the coils are wrapped with a separating foil, clamped into molds and hardened. Because of the large dimensions of said rods, damages may occur during transport, during the aforementioned preparations or during the wrapping which is very sensitive in a saturated state. The high pressure required for closing the press, causes deformations in the embedded mica which can result in mechanical tensions in the hardened insulation with ensuing slit and tear formations, as well as in an impairment of quality. The high compression moreover, forces a portion of the impregnating resin, which now contains an accelerator, out of the tape, which resin is then lost. This also necessitates intricate cleaning processes at the press after each use. The press, by its heavy structure, determines and prolongs the periods required for heating and for cooling. It is an object of the invention to eliminate these shortcomings.

A device for impregnating the winding coil of electrical conductors or conductor bunches for high-voltage machines, has become known, which has two molding cases in form of isomorphous metal bands, subdivided into a groove and a coil head portion and wherebetween appropriate profile or spacing pieces, as well as connecting members, e.g. screw clamps, are inserted. This type of device makes it possible to impregnate a single conductor by maintaining the desired form. It is not possible, however, to impregnate or process simultaneously, a plurality of rods. To avoid this disadvantage, it has previously been proposed to use a multipurpose impregnating and hardening mold constituting an imitation of a portion of the sheet segment of the stators of the electrical machine able to absorb one portion of the coil elements which form the entire stator winding. Thus, a true imitation of a part of the stator stack of laminations is used as an impregnation and hardening form. The advantage of the method is that, in the case of large machines, e.g. hydropower generators of large diameters, whose entire stator stack of laminations cannot be accommodated in the saturation bath because of size, a faithful reproduction is afforded for the shape of the rods which are to be removed from the pack of laminations, after impregnation and hardening, and which are to be embedded in the stator grooves. A disadvantage is found, however, in the large weight of the stack of lamination mold, compared to that of the insulation to be saturated. Furthermore, there is the necessity that each individual rod with the hardened insulation must again be removed from the groove of the stack of lamination mold, in order to place the same into the stator groove whereby, depending on the adherence at the groove wall of the form, bending and pulling forces must be applied which act upon the insulated rod and may impair the latter's quality, especially if the same is very long or has a small cross section with respect to its length.

Moreover, in association with large conductor dimensions, especially coils for turbogenerators, a stack of lamination mold becomes too heavy and hard to handle. The invention aims to solve these disadvantages.

The object of the present invention is a method for impregnating and hardening, in correct dimensions, the wrappings preferably of mica-containing tapes or strips with low adhesive content, for the insulation of winding rods, coils or semicoils (winding elements) particularly for high-voltage machines, whereby the insulating casing, which is wrapped around the winding elements, is impregnated with a synthetic resin with hardening properties. The synthetic resin, after it has penetrated into the insulating casing, is hardened in a manner which determines, in direct dimensions, the outer measurements of the finished insulation. To achieve this purpose, a number of winding elements are placed inside a impregnating and hardening form, equipped with receiving channels, which correspond to the groove dimensions of the stator stack of laminations, to be later provided with the winding. The winding elements are to be inserted in a nonimpregnated state into said receiving channels.

The invention lies in the fact that the winding elements are placed into the receiving channels of the impregnation and hardening form with mutual distance which is smaller than their distance in the stator stack of laminations. Thus, they constitute only a portion of the tooth width. The winding elements together with the spacers, or fillers, which define the receiving channels are stacked in layers to form a unit and hardened. Following the impregnation and hardening process, the hardening agent of the formed unit is removed and the winding elements, as well as the spacers or the filler pieces, are suitably removed in layers. Due to the fact that the winding elements in the impregnating and hardening mold are tightly stacked and hardened, a plurality of rods can be processed simultaneously with a relatively small and light form. At the same time, this results in an easy mounting and dismantling of the rods within the impregnation and hardening form, without involving the danger of damaging the insulation surface.

Another feature of the invention is that winding elements, particularly rods which have a straight groove portion and an involute or similarly shaped coil head should be so processed that the rods with their wide sides adjoining, should be crowded, with the aid of spacers or filler pieces, in an arc corresponding to the future position of the winding elements in the stator pack of laminations. Compared to their future position, the winding elements should be crowded together in peripheral direction and be stacked to form a sectorlike packet and fixed or hardened. The rods which are to be installed within a large peripheral angle region of the stator stacks of laminations can be crowded together, in this manner, in a considerably smaller peripheral angle region, within the impregnating and hardening form, and can be processed in a stacked and fixed position which provided a considerable savings in space and weight with respect to the impregnating and hardening form, to the impregnating installation and the saturating resin required.

According to still another feature of the invention, it is preferred to crowd the rods with their groove portions in peripheral direction and to stack them in such a manner, that they support one another with the wide sides of their end turn portion and lie impregnated upon each other. By virtue of this feature of the invention, it becomes possible to avoid complicated impregnation and hardening forms for the end turn region, rather, the curved end turn parts are mutually formed and require only a fixation and holding of the ends. It is therefore expedient if the end turns of the rods are arranged in arcs and in peripheral direction in crowded condition and fixed at a mutual distance from each other.

According to a further feature used in the processing of straight coil rods or such winding elements which have small or no involute arcs in the end turns, the method of the invention can be so simplified that the rods, lying flat, i.e. with their wide sides adjoining, are stacked by inserting spacers or fillers above or next to each other, in form of rectangular packets, and fixed. The wide side stacking and fixing has the advantage that the required pressure used to close the impregnating and hardening form, which is now exerted by the sealing elements, in the direction of the wide sides, from the surface of the stacks in stacking direction, is uniformly distributed over all the rods, thus contributing to a homogeneous accuracy to size, for the insulations of the rods.

According to the present invention, whether used to produce straight winding rods or to produce rods with curved coil portions (coils or semicoils), it is of additional advantage to have the winding elements in the groove or end turn portion wrapped, prior to stacking, in a impregnation-permeable dividing jacket comprised of smooth synthetic or paper tapes, which can be removed again following the impregnation and hardening process. Such separating foils facilitate the reconstruction of the winding elements since they prevent gluing of the rods to the spacers or filler pieces, or of the rods to one another. The separating foils, simultaneously constitute a protection for the as yet unsaturated wrapping and result in smooth surfaces for the saturated and hardened insulations. In the winding head region where, in accordance with the invention, the rods lie impregnated with their wide sides upon each other, it is preferable to wrap every other winding element in a separating jacket, which is removable following the impregnation and hardening process. The separating jacket need not be porous only at its exposed places, but can per se be permeable to the saturation resin.

According to a preferred embodiment of the invention, the upper and under rods, respectively the upper layers and the supports of a coil to be saturated and hardened, may be arranged in layers alongside each other to form a unit and be fixed. If this unit is a rectangular rod packet, it is not only possible to stack alongside each other two packets for upper and lower rods and to fix them, but it also becomes possible to provide the saturation and hardening form with three or more rod packets.

The invention recognizes that the disclosed method is applicable also to coils, preferably in such a manner that the coils, prior to being inserted into the impregnation and hardening form, are provided, in a known manner, with a wrapping so that the coil protrusions or noses, i.e. the locations which during their installation into the machine are stressed for bending or torsion, remain pliable after the saturation and hardening process and that the final insulation of the coil noses takes place only following the installation of the coils into the machines. This can preferably be so effected that in the region of their noses, the coils are wrapped with mica-containing bands or tapes, which do not contain an accelerator and that the final hardening is effected only following the installation of the coils into the grooves. Insofar that the coil noses are not wrapped and hardened but remain pliable, it is also expedient to stack and fix the coil legs in one plane, i.e. in form of a rectangular packet and, following the impregnation and hardening processes to shape them to fit the stator stack of laminations, for their insertion into the grooves in a cylindrical area, and to insulate them subsequently.

The present invention also has as an object a device for performing the above-disclosed method. This device is mainly characterized by the fact that it consists of a basic frame or basic plate which corresponds to the rod length. The rods are stacked upon each other on said frame or plate, which is also equipped with appropriate filler pieces or spacers, preferably in form of strips of hard paper or the like, bracing the basic frame on both sides of the rods, or defining with the frame the final cross section of the rods, or the receiving channels. There are also cover plates which, placed upon the completely stacked rod packet together with the tension or compression elements, that can be clamped opposite the basic frame and easily dismantled, fix the rod packet into a transportable, rigid, as well as correctly dimensioned, formed unit.

Other features and advantages of the present method as well as of the device for its execution will be disclosed in the following, with the help of a drawing which illustrates several embodiment examples wherein.

Figure 7:
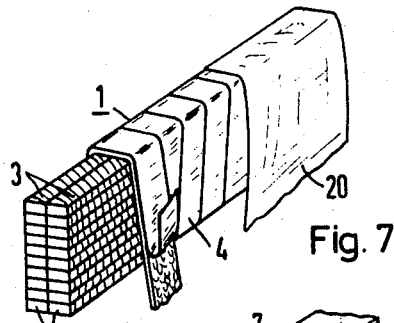
FIG. 7 is a perspective view of a rod with an applied mica tape insulation which can be processed in the saturation and hardening form, in accordance with the invention.
Figure 8:
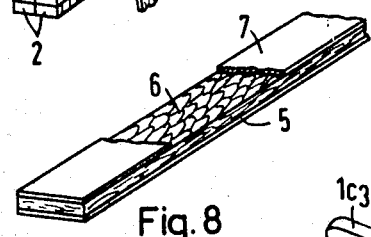
FIG. 8 shows by comparison to FIG. 7, a larger, also perspective illustration of a mica tape which can be wound around a rod, according to FIG. 7.

In greater detail, the portion (FIG. 7) of a winding rod 1, which for greater clarity is provided with an unfinished insulation, consists of individual, massive partial conductors 2, comprised of copper, each provided with a resin-impregnated glass fiber covering (partial conductor insulation), whereby the individual partial conductors 2 each with insulation layers 3, are glued together with a suitable adhesive resin, e.g. an epoxy resin. The insulating jacket 4, which preferably consists of mica-containing tapes or bands with a small content of adhesive, is wound around said conductor unit. A suitable buildup of mica tapes is shown in FIG. 8. The mica tape consists of a flexible base 5 of paper, such as Japan paper, several $\mu$ thick, or of fabric or synthetic foil. Upon the heat-resistant base 5, are placed mica layers 6, which may consist of small mica flakes or continuous mica foils, to form the so-called mica paper. These mica layers 6 are glued together with the base 5 and, if necessary, with a sealing cover layer 7, by a binder which is not self-hardening but which does have hardening properties. This binder, installed into the mica tape for mechanical reinforcement, and which amounts to approximately 3 to 7 weight percent relative to the weight of the mica tape, is selected to be completely installable into the resin hardener system which is used for subsequent impregnation. Furthermore, the mica tape 4 preferably contains an accelerator to shorten the reaction period of the resin hardener system which penetrates into the insulation, so that the material which remains in the impregnation bath shows no increase in its viscosity, despite the hardening of the portion that enters the insulating jackets 4, and can thus be used for a great number of impregnation cycles.

The binder or adhesive used for cementing the conductor portions 2, 3, is preferably comprised of a hardener-free epoxy compound, such as the bis-glycidylether of diphenylolpropane, though the invention is not limited to these resins. It should also be understood that the present invention is applicable to the most varied rod shapes 1, whether they represent massive partial conductor portions 2, as illustrated, or even massive and/or hollow conductor parts, or cooling pipes and be transposed or twisted. It is important for the invention that the wrapping 4 possess only a relatively small adhesive content, respective to that to be provided during wrapping, so that the completely taped rod is not yet swollen up and can be placed into the impregnating and hardening form according to FIGS. 1 to 5, i.e. the receiving channels 8, which define the groove sizes, without the use of great pressure, for closing the impregnating and hardening form wherein subsequent to a previous drying process, saturation is effected under a vacuum with a heat hardening impregnating resin mixture. Thereafter the hardening process ensues. When epoxy resin compounds can be used as binders for the mica tapes 4, it is preferable that the impregnating resin constitute an epoxide resin mixture, on the base of bi- or higher functional glycidyl ethers, or epoxide compounds and acid anhydrides. The impregnating temperature is approximately 60° to 70° C., safeguarding that the viscosity of the epoxide impregnating resin mixture will be less than 30 cp. during impregnation, so that the jacket 4 which is now wound around the winding rod 1, will be completely saturated. The chemical reaction of such an impregnating process, as well as the temperature and time, as well as the chemical reaction, temperature, pressure and time of the ensuing hardening process are known and can be derived from German Pat. No. 1,162,898, corresponding to U.S. application Ser. No. 204,445 of June 22, 1962, now abandoned in favor of application Ser. No. 796,938, now U.S. Pat. No. 3,556,925. At any rate, it is essential that during the impregnating process, the saturating resin penetrates the entire winding insulation and together with the already present adhesive resin of the taping 4, forms, by the subsequent hardening under heat, a homogeneous, correctly dimensioned insulating jacket for the coil insulation.

This impregnating and hardening process, as well as the pre- and aftertreatment of the winding elements can now be carried out, according to the invention, in a particularly simple and preferred manner. As can be seen from FIGS. 1 and 2, this is so effected, that several of the winding elements $1a$, which are constructed for example as in FIG. 7, are placed with mutual spacing $a$ into the receiving channels 8 of the saturating and hardening form 9. This spacing or distance, is obviously much less than that of the winding elements $1a$ and $1a'$ in inserted condition, in the stator stack of laminations. To this end, the winding elements $1a$ and $1a'$, together with the spacers or the filler pieces $10a$ to $10d$, which define the receiving channels 8, are stacked in layers, to form a unit 11, the formation of which is illustrated only in the left half of FIG. 1 with a corresponding formed bond to be imagined in the right half of FIG. 1.

Figure 1:
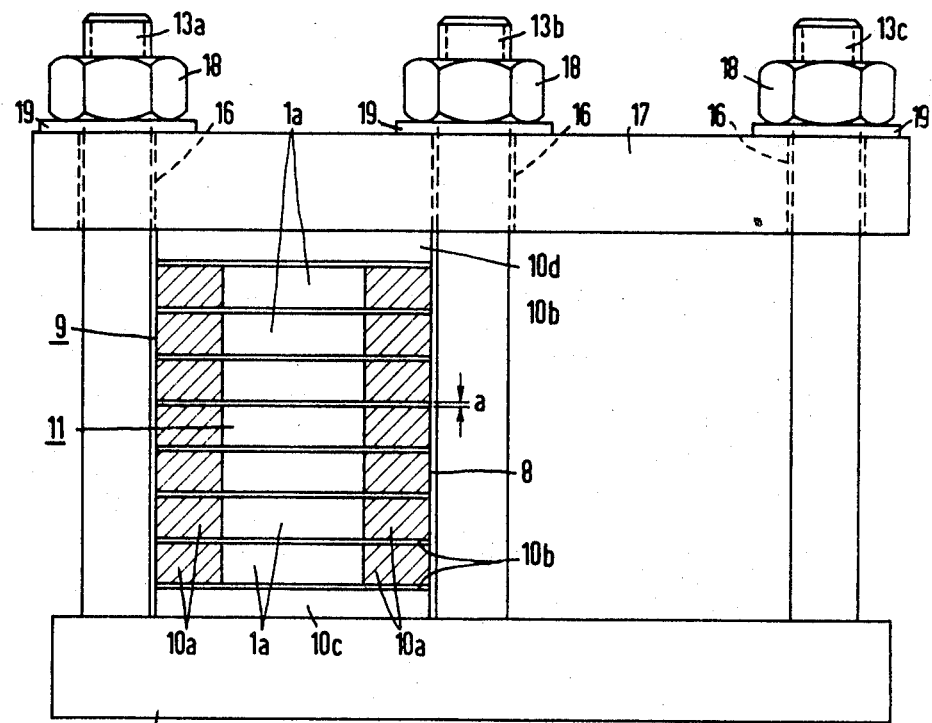
FIG. 1 is a simplified illustration, partly in section, showing the front view of a unit formed of straight winding rods, within the provided impregnation and hardening form.
Figure 2:
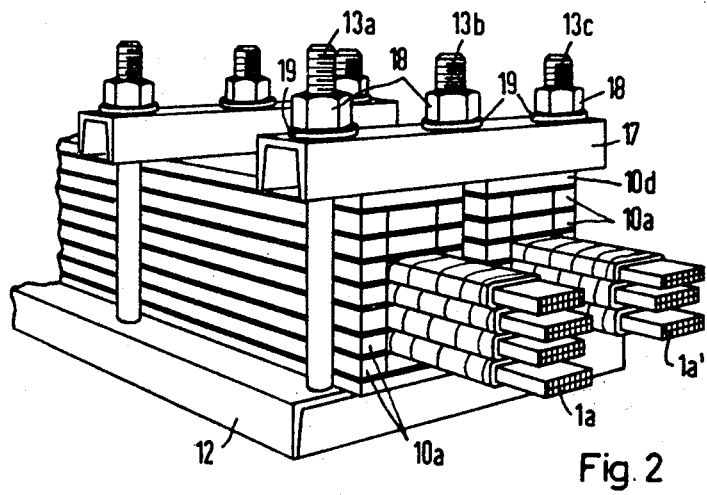
FIG. 2 is a perspective of FIG. 1.

The saturating and hardening form 9, according to FIGS. 1 and 2, which is preferred in the processing of winding rods that have no, or only small involute arcs in the winding end or which are constructed as straight winding rods, consist of a frame base 12, corresponding to the length of the rod. The frame base 12 is provided with studs 13 aligned in the longitudinal direction of 12 and in the present example is seen as a row of studs, $13a$, $13b$ and $13c$. The frame 12 is also equipped with baseplates $10c$ extending in the longitudinal direction of 12 and comprised of 10-millimeter sheets. Upon these base sheets $10c$, is placed an intermediate sheet $10b$ with a smooth surface and thereon a rod $1a$ on its wide side, two filler pieces $10a$, in the form of hard paper strips, are inserted as the end layer between the row of studs $13a$, $13b$ or $13b$, $13c$. Subsequently, the next layer is inserted, i.e. the intermediate sheet $10b$ with rod $1a$ and paper strips $10a$, thereupon the third layer and so on, up until the uppermost layer (seven layers are illustrated) is covered by a final sheet $10d$ which has a design and thickness corresponding approximately to baseplate $10c$. Finally, the crossbeams or staybolts 17 equipped with suitable bores 16, are pushed perpendicularly to the longitudinal direction of the frame base 12 upon the series of studs $13a$, $13b$, $13c$ and the nut 18 is tightened under light pressure on washers 19, thereby closing the impregnating and hardening form. This closed state is schematically indicated in FIGS. 1 and 2, where the ends of the rods with their filler pieces and spacers are partly cut off for a better view. Here, the filler pieces, respectively the spacers in form of hard paper strips $10a$, the intermediate sheets $10b$, as well as the base sheet $10c$, the cover sheet $10d$ and the basic frame 12, in conjunction with the studs 13, and crossbeam 17 define, in a closed state of the impregnating and hardening form 9, exactly and in correct dimensions, the receiving channels 8. The impregnation and hardening form 9 can now be placed into the impregnating bath and rods $1a$, and $1a'$ be impregnated. Subsequently, the hardening process takes place in the same impregnating and hardening form. Thereafter, the impregnating and hardening form 9 can be reopened in opposite sequence from the aforedescribed process of insertion, i.e. the stacking and fixing, and the individual rods $1a$, $1a'$ can be removed. This can be easily accomplished since portions $10a$ to $10d$ are easily removable from rods $1a$, $1a'$, so that surface damage to the insulation 4 will be avoided. Removal is specially easy if the rods $1a$, $1a'$ are wrapped, prior to their installation, along their entire length, into a separating foil 20 as seen in FIG. 7. This separating foil 20 is preferably comprised of smooth synthetic material or paper strips, which can easily be removed following the impregnating and hardening process, without causing damage to the insulation 4. Tearing or destruction of said foil is of no consequence, due to its low value.

The method and the device according to FIGS. 3 to 6 is preferably suited for treating winding elements, particularly winding rods which have a straight groove portion and a coil end portion which is involutely or similarly curved. It is particularly preferable, as will be shown later, that the shape for the coil head portion can be obtained in a particularly preferred manner. To this end, as shown in principle in FIG. 3, the rods $1b$ and $1b'$ which for simplicity are shown just as in FIGS. 1 and 2 in rectangular cross sections, are stacked, with their wide sides adjoining, by inserting spacers and filler pieces, $14a$ to $14f$, into their future position corresponding to arcs 15, in the stator stack of laminations (not shown). They are crowded together, in comparison to their future position, in the peripheral direction, to form a sectorlike packet 21, and are fixed. As shown by FIGS. 3 to 6, the arrangement is effected in accordance with a preferred embodiment of the invention in a manner whereby rods $1b$ and $1b'$ and their groove portions $n$, are so crowded together in peripheral direction, that their wide sides $w1$ of their winding end portions $w$, lie satiated upon each other, in mutually bracing and forming relation. In order to sustain the weight of the winding end parts and to fix these exactly in their mutual position, it is preferred to also arrange the winding ends 2 (see in particular FIGS. 3 and 4) crowded together in peripheral direction, and to fix them with a mutual distance.

Figure 3:
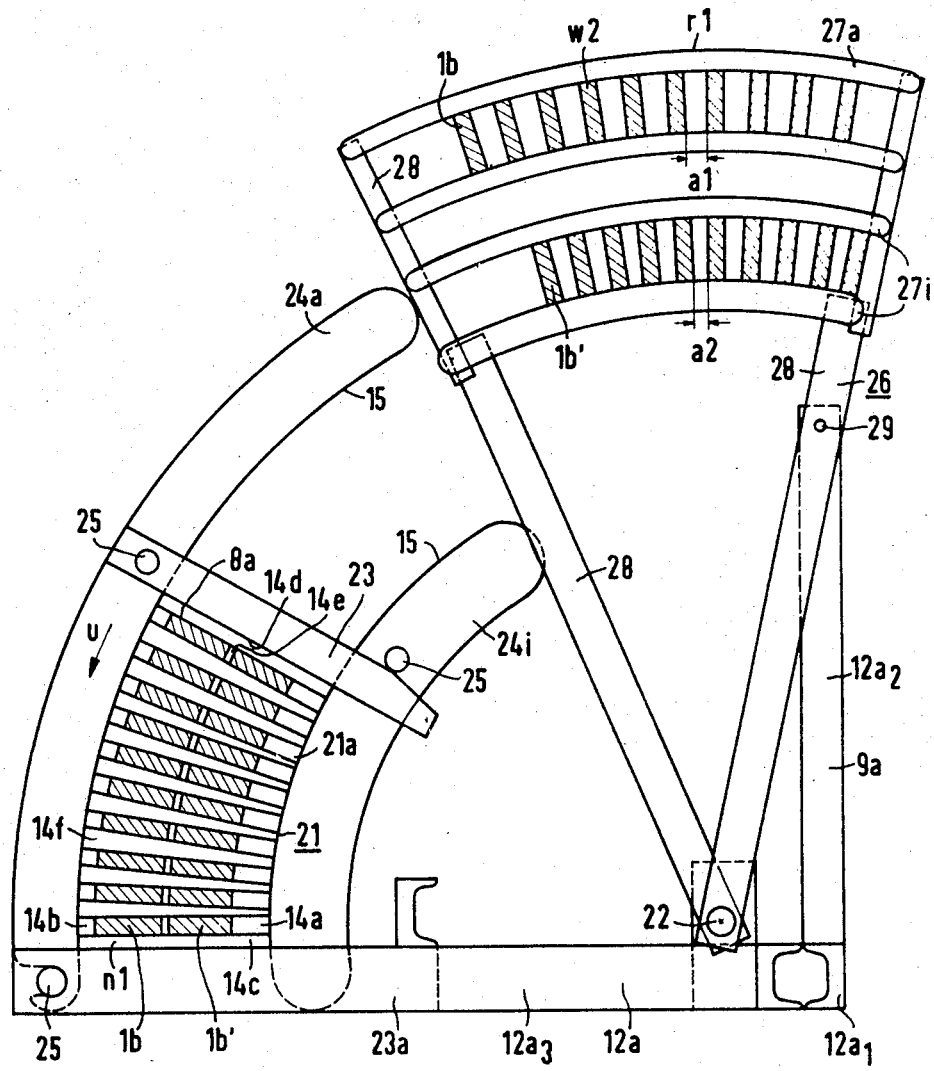
FIG. 3 is a unit, composed of winding rods, which has straight groove portions and curved winding end portions, in the provided impregnation and hardening form, shown in front view.

The insertion of the rods $1b$, $1b'$ with their groove portions $n$ and their winding end portions $w$ into the saturating and hardening form $9a$ of FIGS. 3 to 6, is effected in the same sense as in FIGS. 1 to 2. Thus they are stacked together with the spacers or filler pieces $14a$ to $14f$, which define the receiving channels $8a$, lengthwise, to form a unit 21 and are fixed in position. Subsequently, in the same stacked and fixed position (as shown in FIG. 3) they are placed into an impregnating bath (FIG. 6) wherein they are impregnated and hardened under heat. Following a cooling process, the impregnating and hardening form $9a$ is opened and the rods are removed lengthwise, together with their spacers or filler pieces $14a$ to $14f$. In analogy to the embodiment example of FIGS. 1 and 2, where upper rods $1a$ and lower rods $1a'$ of a winding are placed together into the saturating and hardening form 9, it is preferable to place lower rods $1b$ and upper rods $1b'$ simultaneously, as illustrated, into the impregnating and hardening form $9a$, since this makes it possible to define the outside dimensions of the insulation with respect to their future positions, i.e. a position which corresponds exactly to the groove dimensions. The impregnating and hardening form $9a$ also consists, preferably, of a basic frame $12a$ which defines, however, the middle axis of the winding to be produced, due to the arc-shaped arrangement (axis 22). On this basic frame $12a$—compare particularly FIGS. 3, 4—are placed radial supports or crossbeams 23, $23a$, in radial planes, at an axial distance $a'$ from each other, which are removably connected by arc members, namely outer arc members $24a$ and inside arc members $24i$. Between the two, i.e. the arc member groups $24a$ and $24i$ and the radial beams 23, $23a$, which are on different radii, section-type longitudinal channels $21a$ are bordered in cross section. These longitudinal channels $21a$ serve for receiving the straight groove portion $n$ of the winding elements $1b$, $1b'$ to be stacked together with the spacers $14a$ to $14f$, in the peripheral direction. The spacers or filler members are preferably formed by approximately wedge-shaped intermediate pieces $14f$, adjacent the wide sides of the rod $n_1$, by outside strips $14b$ and inside strips $14a$, adjacent the narrow sides of the rod formed by rectangular hard paper strips, and intermediate layers $14e$ which separate the lower rod and the upper rod $1b$, $1b'$ of one layer. Also provided are a bottom surface or base sheet $14c$, which resembles $10c$ of FIGS. 1 and 2 and a cover sheet $14d$, corresponding to $10d$ of FIGS. 1 and 2.

The basic frame itself consists of longitudinal beams $12a_1$, vertical beams $12a_2$ and crossbeams $12a_3$ which are welded together. The lower radial beams 23a may be designed to be rigid and may be connected or identical with the crossbeams $12a_3$. The inside arc members 24i may be bolted with the basic frame 12a, while in order to effect an easy opening and closing of the impregnating and hardening form 9a, the radial beams 23, 23a and the outer arc members 24a are connected in dismantable relation, via removable longitudinal bolts 25.

Figure 4:
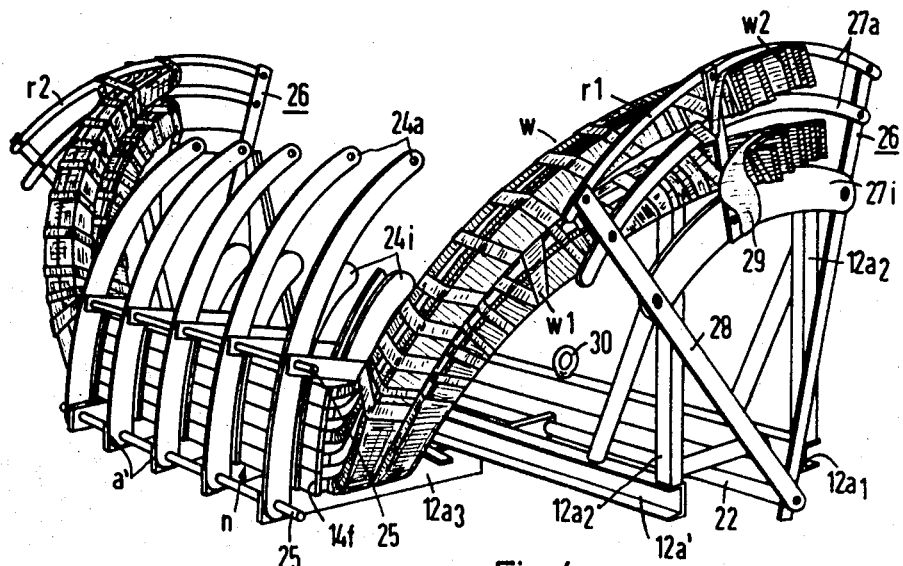
FIG. 4 is a perspective of FIG. 3 with a slight variation.

Thus, while the sectorlike longitudinal channels 21, defined through the impregnating and hardening form 9a, are provided for supporting the straight groove portion n, both ends of the basic frame 12a are each provided with one sectorlike winding head holder 26, arranged in a radial plane, or r1, r2 perpendicular to the center axis of the winding to be produced (see FIGS. 3, 4). These winding end holders 26 have arc members, i.e. outside arc members 27a, and inside arc members 27i, which are assigned to the upper and lower rods 1b, 1b', and whose arc central point is the axis 22. The arc members are interconnected by means of radial beams 28 and mutually fixed in a defined position, as well as attached to the vertical beam $12a_2$ of the basic frame 12a (bearing position 29). The perspective illustration according to FIG. 4 shows, compared to FIG. 3, still another vertical beam $12a_2$, which can be provided for heavy winding heads. As shown in FIGS. 3 and 4, the winding ends w2 are now exactly fixed at a mutual distance a1 and a2; in FIG. 4 the fixing is effected by an adhesive band 29. It is also possible, however, to effect the fixation by means of a comblike member, which is pushed across the winding head ends w2 and affixed to the arc members 27a and 27i, as well as to radial beam 28. This comblike fixing member, which is not shown in detail, should be arc shaped the same as arc members 27a or 27i and be equipped with comb teeth for spaces a1 or a2.

Figure 6:
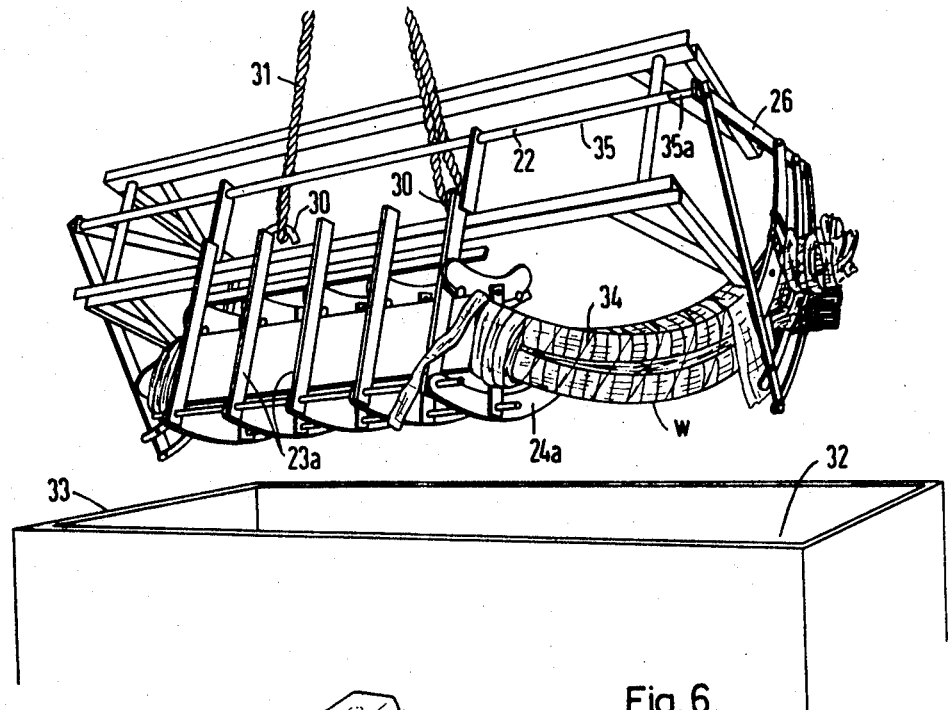
FIG. 6 shows how the apparatus of FIG. 4, i.e. the stacked and fixed unit within the impregnation and hardening form, is suspended from a crane (not shown) shortly before being lowered into a saturation device.

After the lower and upper rods 1b, 1b' have been placed, in the aforedescribed manner, into the impregnating and hardening form 9a, the form is closed, i.e. the radial beams 23 are brought, with the longitudinal bolt 25, into their position according to FIGS. 3, 4, 6, if necessary accompanied by light pressure, and the winding end portions w are fixed, as described, within the winding end holders 26. The impregnation and hardening form 9a is thus ready and constitutes a rigid structure which exactly defines the groove dimensions and the winding end form of the rods to be processed. According to FIG. 6, said structure is to be hung on by hooks 30 to a crane (not shown), by ropes 31, and can be lowered into the saturation bath 32 of impregnating vessel 33.

Following the impregnation process, which was previously disclosed and is known, the hardening process is carried out in the same impregnating and hardening form, by means of heat, in a furnace or the like and, following the cooling process, the form 9a is reopened and the rods 1b, 1b' may be removed in sequence.

Figure 5:
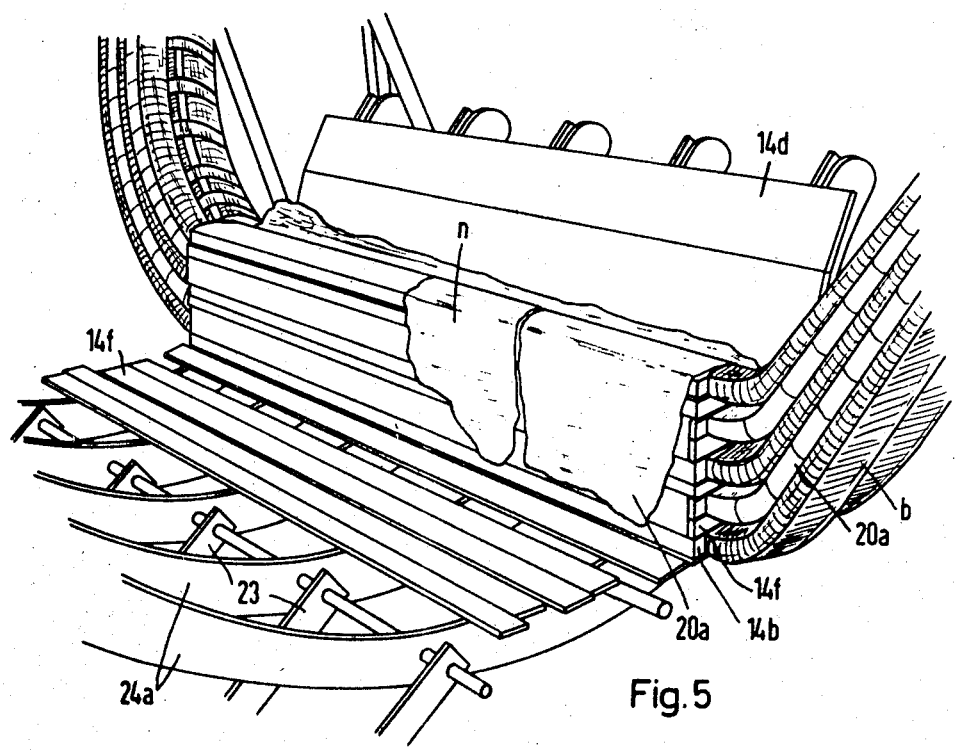
FIG. 5 is an enlarged detail illustration of the opened impregnation and hardening form of FIG. 4 in the groove region of the rods, and shows how the rods can be installed or removed.

FIG. 5 shows an opened saturating and hardening form 9a in detail, whereby the outside arc members 24a and the radial beams 23 are placed into an unhinged position, after loosening the longitudinal bolts 25. This figure as well as FIG. 4 also shows additional longitudinal strips 14f which act as additional filler members or spacers, and which can serve for further standardizing the pressure in a radial direction, or for balancing the tolerance, as well as for adjusting the impregnation and hardening form to the desired groove cross section. The figure also shows cover plate 14d in raised position and also rods 1b, 1b' provided with a separating foil 20a. A foil is provided in the groove section n, for each rod 1b or 1b' in the impregnating and hardening form 9a, and in the region of the winding ends for every second rod 1b or 1b'. In the groove region, this has the effect that the rods can be easily removed from the impregnating and hardening form and that a smooth insulating surface will be obtained, while in the winding head region w it ensures that the winding end portions w, which lie impregnated one upon another with their wide sides w1, will not cake and will be easily separated from each other, which also results in a smooth insulation surface.

FIG. 6 shows an additional protective wrapping 34 for the winding head portion w. This figure also clearly shows that a central pipe 35 is arranged in the winding axis 22, whereon the winding head holders 26 are positioned in displaceable relation, with the aid of the pipe portions 35a, and are capable of being shifted in longitudinal direction. This affords an adjustment to various rod lengths.

The receiving channels 21a or 8 can be varied in regard to their cross section and/or their length, also by other means. This is made possible by exchanging spacers, filler pieces 10a to 10d (FIGS. 1 and 2) or 14a to 14f (FIGS. 3 to 6), which have altered dimensions to correspond to the desired rod shape. Also, for a rough adjustment to the desired rod dimensions, the arc members 24i, 24a and radial beams 23, 23a may be provided with bores, arranged at various distances, which permit an assembly in altered relation, with the aid of longitudinal bolts 25 or the like. The same applies for the winding head holders 26 and their arc members 27a, 27i, as well as the radial beam 28 (this is not shown).

As shown especially in FIG. 5, the stacking and fixing or the dismantling of rods 1b, 1b' is also very simple, whereby during the insertion as well as the removal of the rods from the saturating and hardening form 9a, surface damages are impossible. Even though FIG. 3 shows a impregnation charge with 10 upper rods 1b and 10 lower rods 1b', it must be understood that this rod number can be varied (compare FIGS. 4 and 5 with five upper and lower rods). We recognize therefrom that, due to the strongly crowded position in peripheral direction u, a large peripheral angle region of the future stator stack of laminations can be provided with finished rods, without necessitating the use of a large saturation and hardening form. The wedge-type intermediate pieces 14f are made considerably narrower than the teeth of the future stator stack of laminations while the receiving channels 8a define the groove dimensions, exactly as in the stator stack of laminations.

Figure 9:
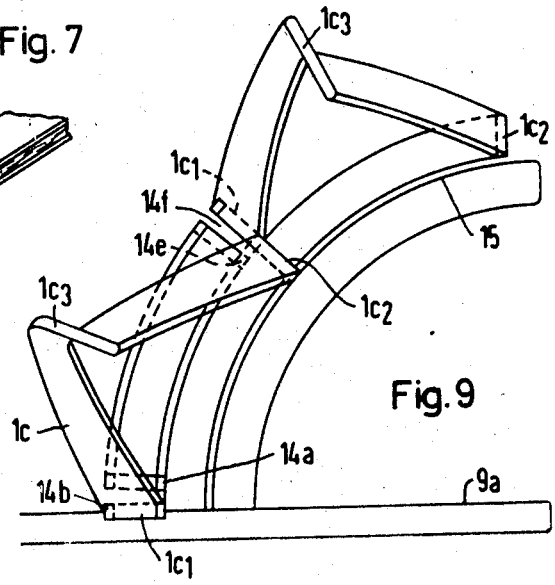
FIG. 9 is a schematic illustration of an arrangement of coils in a impregnating and hardening form.

FIG. 9 also indicates that coils 1c can be placed, with supports $1c_1$, overlayers $1c_2$ and with coil noses or protrusions $1c_3$, into a impregnating and hardening form, according to FIG. 3, where they are treated. Thus the upper and bottom layers are preferably so fused that the winding ends mutually form and support one another. The coil protrusions $1c_3$ remain elastic up to their final installation into the machine, so that the coils can still be bent to a desired degree, during their insertion. Parts which correspond to FIG. 3 have the same numerals. In the interest of clarity, only two coils are shown. The arrangement of the coils which are to adjoin each other very densely in peripheral direction, is effected similarly as in the machine so that one side of a coil lies in the upper position, while its other side appears in the lower position.

We claim:

1. Method of impregnating and hardening in correct dimensions, insulation wrappings, which consist of mica-containing tapes or strips with a low adhesive content, of winding elements having a straight slot portion and an involute winding end portion for use in an electrical high-voltage machine, whereby an insulating jacket of the slot portion and of the winding end portion which is wound upon the winding elements is impregnated in one working step, with a synthetic resin which can be hardened, whereupon the synthetic resin which has penetrated the insulating jacket is hardened in a manner that determines the actual outer dimensions of the finished insulation wherein the straight slot portions of a plurality of the wrapped winding elements, with their wrappings in unsaturated condition, are placed into receiving channels of an impregnating and hardening form, said receiving channels being used for both the impregnation process and the hardening process, and the dimensions of the receiving channels being equal to the slot dimensions in a stack of stator laminations of the electrical high-voltage machine in which wrapped elements will ultimately be used, further consisting of a. alternately stacking on a jig a plurality of the slot portions of the winding elements and the spacers of each of said slot portions, said spacers defining a receiving channel, about each of said slot portions, and providing spacing between individual slot portions, said spacing being substantially less than the peripheral spacing between said slots of said stator, said slot portions being stacked such that their widest sides are adjacent;

b. supporting the involute portions of the wrapped winding elements by stacking said involute portions and spacers between each of said involute portions on a holding frame which supports said involute portions in the same radial and axial positions that will occupy when the winding elements are assembled with the stator but with the spacers between the involute portions providing spacing in the peripheral direction substantially less than the peripheral spacing the involute portions will have when the winding elements are assembled with the stator;

c. resin impregnating the wrappings of the stacked and supported winding elements;

d. hardening the resin which has impregnated said wrapping while said elements are stacked and supported;

e. subsequently removing the spacers and supporting apparatus from the position relative to the winding elements; and f. placing the thus-treated winding elements into stator slots of the electrical high-voltage machine, whereby the peripheral spacing of the stator slots is greater than the peripheral spacing of the receiving channels of the impregnating and hardening form and the peripheral spacing of the involute portions of the winding elements is greater than the peripheral spacing of said involute portion during their impregnation and hardening.

2. The method of claim 1, wherein at least one of the winding elements in the slot and involute region are wrapped, prior to stacking, with a separating wrapper which is removable following the impregnating and hardening process.

3. The method of claim 2, wherein in the end turn region, each second winding element is wrapped in a separating wrapper.

4. The method of claim 1, wherein the upper and lower winding elements are stacked in piles adjacent each other and locked in place.

5. The method of claim 1, wherein the elements with their slot portions are so crowded together in the peripheral direction that they lie upon each other separated only by the spacers, the winding end portions mutually bracing and forming themselves during the impregnating and hardening treatment.

6. Method of impregnating and hardening in correct dimensions, insulation wrappings, which consist of mica-containing tapes or strips with a low adhesive content, of winding elements having a straight slot portion for use in an electrical high-voltage machine, whereby an insulating jacket of the slot portion which is wound upon the winding elements is impregnated in one working step, with a synthetic resin which can be hardened, whereupon the synthetic resin which has penetrated the insulating jacket is hardened in a manner that determines the actual outer dimensions of the finished insulation, wherein, the straight slot portions of a plurality of the wrapped winding elements, with their wrappings in unsaturated condition, are placed into receiving channels of an impregnating and hardening form, said receiving channels being used for both the impregnation process and the hardening process, and the dimensions of the receiving channels being equal to the slot dimensions in a stack of stator laminations of the electrical high-voltage machine, in which wrapped elements will ultimately be used a. alternately stacking on a jig a plurality of the slot portions of the winding elements and the spacers of each of said slot portions, said spacers defining a receiving channel about each of said slot portions and providing spacing between individual slot portions, said spacing being substantially less than the peripheral spacing between said slots of said stator, said slot portions being stacked such that their widest sides are adjacent;

b. resin impregnating the wrappings of the stacked winding elements;

c. hardening the resin which has impregnated said wrapping while said elements are stacked;

d. subsequently removing the spacers from the position relative to the winding elements; and e. placing the thus-treated winding elements into stator slots of the electrical high-voltage machine, whereby the peripheral spacing of the stator slots is greater than the peripheral spacing of the receiving channels of the impregnating and hardening form.

* * * * *